United States Patent
Baek (10) Patent No.: US 12,476,895 B2
(45) Date of Patent: Nov. 18, 2025

(54) DEVICE FOR CONSTRUCTING NEURAL BLOCK RAPID-PROPAGATION PROTOCOL-BASED BLOCKCHAIN AND OPERATION METHOD THEREOF

(71) Applicant: LEADPOINT SYSTEM INC., Jeonju-si (KR)

(72) Inventor: Eun Ju Baek, Namyangju-si (KR)

(73) Assignee: LEADPOINT SYSTEM INC., Jeonju-si (KR)

( * ) Notice: Subject to any disclaimer, the term of this patent is extended or adjusted under 35 U.S.C. 154(b) by 569 days.

(21) Appl. No.: 18/059,907

(22) Filed: Nov. 29, 2022

(65) Prior Publication Data

US 2023/0091864 A1    Mar. 23, 2023

Related U.S. Application Data (63) Continuation of application No. PCT/KR2022/002800, filed on Feb. 25, 2022.

(30) Foreign Application Priority Data

Apr. 29, 2021  (KR) .......................... 10-2021-0055359

(51) Int. Cl.
  *H04L 45/02* (2022.01)
  *H04L 45/16* (2022.01)
  *H04L 67/1042* (2022.01)

(52) U.S. Cl.
  CPC .............. *H04L 45/02* (2013.01); *H04L 45/16* (2013.01); *H04L 67/1042* (2013.01)

(58) Field of Classification Search
  None
  See application file for complete search history.

(56) References Cited

U.S. PATENT DOCUMENTS

2019/0068246 A1* 2/2019 Zhao .................. H04B 5/20
2021/0006400 A1* 1/2021 Hu .................... H04L 9/3239

FOREIGN PATENT DOCUMENTS

JP      2020-509680 A    3/2020
KR  10-2018-0124960 A   11/2018
(Continued)

OTHER PUBLICATIONS

"Cella, KR20200037816 (English Translation) Methods and systems for detection in an industrial Internet of Things data collection environment with large data sets, 2020" (Year: 2020).*
(Continued)

*Primary Examiner* — Derrick W Ferris
*Assistant Examiner* — Keith Follansbee
(74) *Attorney, Agent, or Firm* — Harvest IP Law, LLP (57) ABSTRACT

An operation method of a device for constructing a neural block rapid-propagation protocol (NBRP)-based blockchain according to an embodiment of the present invention comprises: a routing acquisition step of obtaining routing information for one or more participant node terminals participating in a blockchain network; a topology configuration step of activating an NBRP as a scheme of data transmission or reception, and identifying a peer node terminal among the participant node terminals on the basis of the routing information; a communication mode determination step of determining a communication process by determining whether the NBRP is activated for the peer node terminal; and a data processing step of processing synchronization and session data communication for transaction data or block data with the peer node terminal according to the communication process.

10 Claims, 9 Drawing Sheets

(56) References Cited

FOREIGN PATENT DOCUMENTS

| | | | | |
|---|---|---|---|---|
| KR | 10-2020-0037816 A | | 4/2020 | |
| KR | 20200037816 A | * | 4/2020 | ........... H04B 17/318 |
| KR | 10-2020-0131307 A | | 11/2020 | |
| WO | 2019/205980 A1 | | 10/2019 | |

OTHER PUBLICATIONS

Non-Final Office Action for KR 10-2021-0055359 by Korean Intellectual Property Office dated May 4, 2022.
International Search Report & Written Opinion of International Searching Authority for PCT/KR2022/002800 dated Jun. 3, 2022.

* cited by examiner

S2011 — Receive new transaction information from first NBRP peer node terminal and perform verification thereon when communication process corresponds to NBRP communication process S2013 — Store verified new transaction information in memory pool provided as data storage space S2015 — Propagate verified new transaction information to NBRP peer node terminals, excluding first NBRP peer node terminal, by way of broadcasting

DEVICE FOR CONSTRUCTING NEURAL BLOCK RAPID-PROPAGATION PROTOCOL-BASED BLOCKCHAIN AND OPERATION METHOD THEREOF

CROSS-REFERENCE TO RELATED APPLICATIONS

This application is a continuation of pending PCT International Application No. PCT/KR2022/002800, filed on Feb. 25, 2022, which claims priority to Korean Patent Application No. 10-2021-0055359 filed on Apr. 29, 2021, the entire contents of which are hereby incorporated by references in its entirety.

TECHNICAL FIELD

The present invention relates to a neural block rapid-propagation protocol applied as a low-latency propagation method of data communication between nodes participating in a blockchain network, and more specifically, to a device for constructing a neural block rapid-propagation protocol-based blockchain and an operation method thereof, which can rapidly propagate information on transactions and blocks generated in the blockchain network.

BACKGROUND ART

Generally, a blockchain utilizes a peer-to-peer (P2P) network as one of distributed databases. A distributed database is a technique of distributing data physically so that a plurality of users may share a large-scale database. The blockchain is a list of structure that stores data, and node terminals participating in the network may store data and jointly record and manage ledger data that records transaction information through verification.

As an example of blockchain utilization, a blockchain may be constructed by node terminals of virtual currency users connected through the Internet to configure a P2P network. Through this, blocks containing transaction details of virtual currency may be managed in a user node terminal, and connected to new blocks and propagated. When a new block is generated, a block that is verified through a consensus algorithm of a plurality of participants (node terminals) may be connected to existing blocks, confirmed as a final ledger containing transaction details, and stored in a distributed manner. In addition, when a transaction occurs in a participating node terminal, transaction information verified through validity verification on the transaction is propagated to each node terminal. Through this, transaction details, i.e., verified transactions, are propagated and stored in a distributed manner, and when some nodes falsify the data, authenticity may be identified based on the transactions stored in a distributed manner. The security stability of the blockchain increases as more users share the data. The blockchain is utilized for various online services such as cloud computing service and the like, in addition to Bitcoin.

The blockchain technique may reduce transaction cost and prevent data forgery and falsification by changing the existing centralized data management structure to a decentralized or distributed data management structure. Such a blockchain technique may generate economic values in combination with industries such as finance, medical, contents, public, logistics, distribution, and energy sectors.

In the blockchain, a node participating in a network may generate a block and propagate information on the generated block to other nodes. In addition, nodes receiving new block information may determine and verify consistency of the new block information. At this point, transaction details that can be included in the newly generated block, i.e., validity verification on the transaction, may also be performed in the nodes participating in the blockchain network.

In addition, a consensus algorithm may be applied to the blockchain network to guarantee integrity and review legitimacy of the block information constituting the ledger managed by the participating nodes. As the consensus algorithm, generally, Proof-of-Work (PoW), Proof-of-Stake (PoS), Delegated Poof of Stake (DPoS), Practical Byzantine Fault Tolerance (PBFT), and the like are applied.

However, in the data communication between nodes participating in the blockchain network, delay in synchronization and session processing of block or transaction information may occur due to the difference in the configuration of logical or physical communication environments.

DISCLOSURE OF INVENTION

Technical Problem

Therefore, the present invention has been made in view of the above problems, and it is an object of the present invention to provide a device for constructing a neural block rapid-propagation protocol-based blockchain and an operation method thereof, which minimize the constraints of logical or physical communication environments between nodes through the neural block rapid-propagation protocol that rapidly propagates block data and transaction data generated by the nodes participating in the blockchain network.

Technical Solution

To accomplish the above object, according to one aspect of the present invention, there is provided an operation method of a node terminal connected to a blockchain network, the method comprising: a routing information acquisition step of acquiring routing information for one or more participating node terminals participating in the blockchain network; a topology setting step of activating a neural block rapid-propagation protocol (NBRP) as a method of transmitting and receiving data, and identifying a peer node terminal among the participating node terminals on the basis of the routing information; a communication mode determination step of determining a communication process by determining whether the neural block rapid-propagation protocol is activated for the peer node terminal; and a data processing step of processing synchronization and session data communication for transaction data or block data together with the peer node terminal according to the communication process.

According to another aspect of the present invention, there is provided a device for constructing a neural block rapid-propagation protocol-based blockchain, the device comprising: a routing information acquisition unit acquiring routing information for one or more participating node terminals participating in the blockchain network; a topology setting unit activating a neural block rapid-propagation protocol (NBRP) as a method of transmitting and receiving data, and identifying a peer node terminal among the participating node terminals on the basis of the routing information; a communication mode determination unit determining a communication process by determining whether the neural block rapid-propagation protocol is activated for the peer node terminal; and a data processing unit processing synchronization and session data communication for transaction data or block data together with the peer node terminal according to the communication process.

Meanwhile, the method according to an embodiment of the present invention for solving the above problems may be implemented as a program for executing the method or a computer-readable recording medium in which the program is recorded.

Advantageous Effects

According to an embodiment of the present invention, synchronization of data may be maximized and transmission and reception of communication messages unnecessarily occupying the network bandwidth is minimized by minimizing propagation of data delayed according to environmental variables of logical or physical communication between nodes through a neural block rapid-propagation protocol that rapidly propagates block data and transaction data generated by the nodes participating in the blockchain network, and at the same time, efficiency of data synchronization and session processing can be maximized by concentrating the processing performance of node terminals on processing major messages.

BEST MODE FOR CARRYING OUT THE INVENTION

Hereinafter, only the principles of the present invention will be exemplified. Therefore, although not clearly described or shown in this specification, those skilled in the art will be able to implement the principles of the present invention and invent various devices included in the spirit and scope of the present invention. In addition, it should be understood that all conditional terms and embodiments listed in this specification are, in principle, clearly intended only for the purpose of understanding the concept of present invention, and not limited to the embodiments and states specially listed as such.

In addition, it should be understood that all detailed descriptions listing specific embodiments, as well as the principles, aspects, and embodiments of the present invention, are intended to include structural and functional equivalents of such matters. In addition, it should be understood that such equivalents include equivalents that will developed in the future, as well as currently known equivalents, i.e., all devices invented to perform the same function regardless of the structure.

Accordingly, for example, the block diagrams in the specification should be understood as expressing the conceptual viewpoints of illustrative circuits that embody the principles of the present invention. Similarly, all flowcharts, state transition diagrams, pseudo code, and the like may be practically embodied on computer-readable media, and it should be understood that regardless of whether or not a computer or processor is explicitly shown, they show various processes performed by the computer or processor.

In addition, explicit use of the terms presented as processors, controls, or concepts similar thereto should not be interpreted by exclusively quoting hardware having an ability of executing software, and should be understood to implicitly include, without limitation, digital signal processor (DSP) hardware, and ROM, RAM and non-volatile memory for storing software. Other known common hardware may also be included.

The above objects, features and advantages will become more apparent through the following detailed description related to the accompanying drawings, and accordingly, those skilled in the art may easily implement the technical spirit of the present invention. In addition, when it is determined in describing the present invention that the detailed description of a known technique related to the present invention may unnecessarily obscure the gist of the present invention, the detailed description thereof will be omitted.

The terms used in this specification are used only to describe specific embodiments, and are not intended to limit the present invention. Singular expressions include plural expressions unless the context clearly dictates otherwise. It should be understood that in this specification, terms such as "comprise" or "have" are intended to specify existence of a feature, a number, a step, an operation, a component, a part, or a combination thereof described in the specification, not to preclude the possibility of existence or addition of one or more other features, numbers, steps, operations, components, parts, or combinations thereof.

Hereinafter, preferred embodiments of the present invention will be described in more detail with reference to the accompanying drawings. In describing the present invention, in order to facilitate the overall understanding, the same reference numerals are used for the same components in the drawings, and duplicate descriptions of the same components are omitted.

Figure 1:
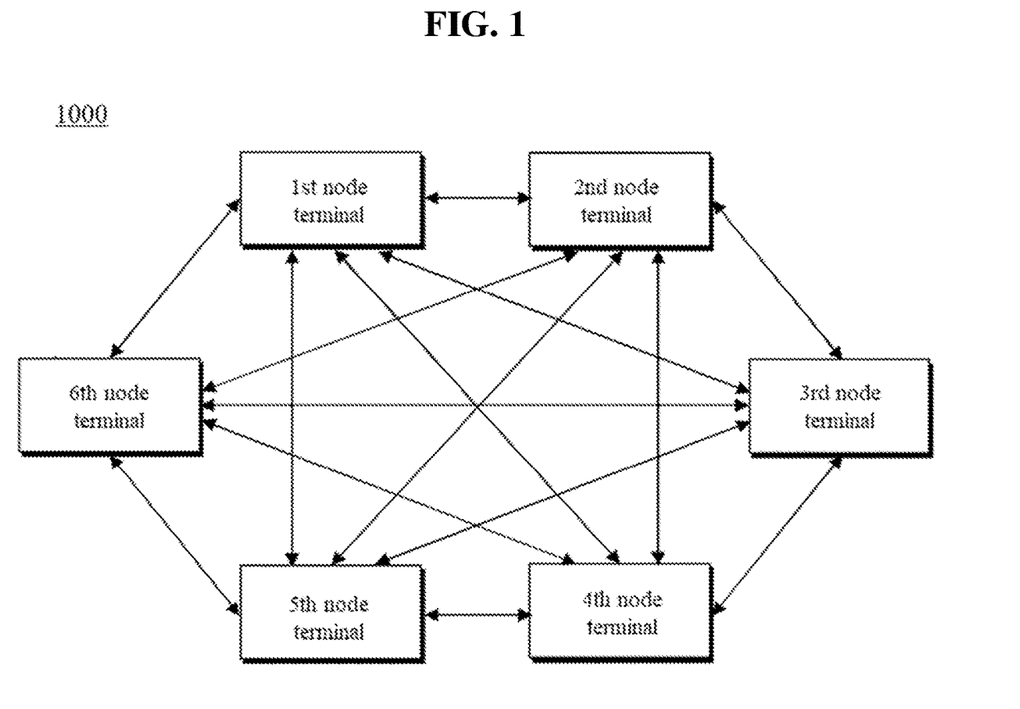
FIG. 1 is a conceptual view schematically showing the entire blockchain network system according to an embodiment of the present invention.
Figure 2:
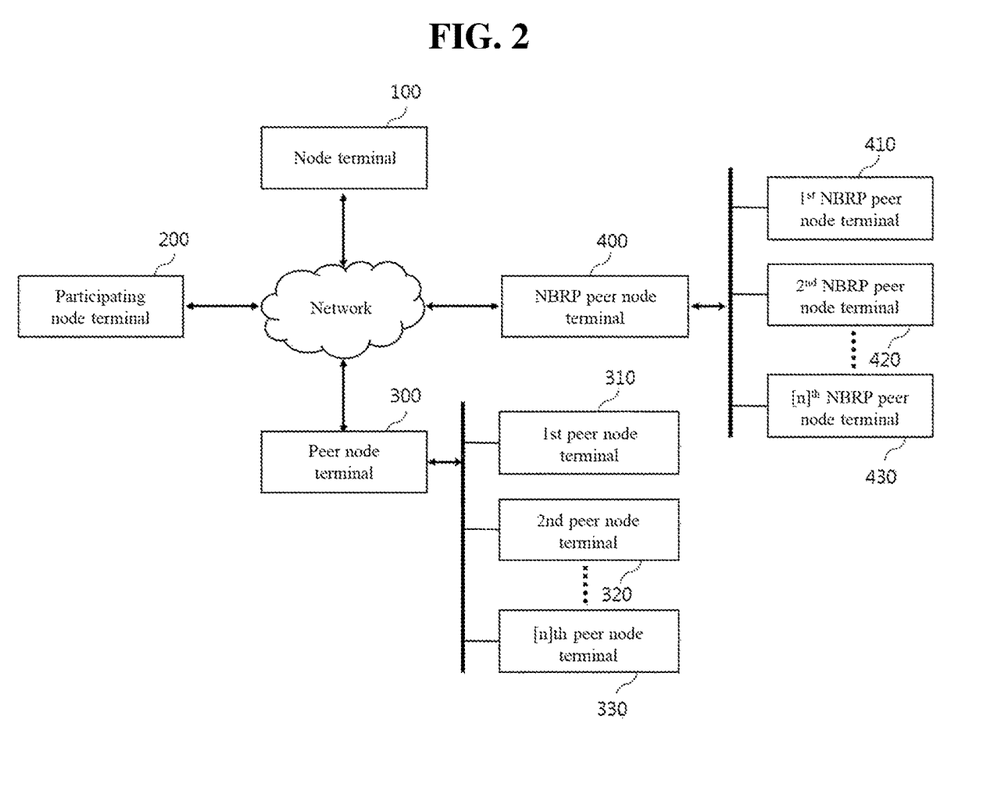
FIG. 2 is a block diagram showing in detail node terminals constituting a blockchain network according to an embodiment of the present invention.

FIG. 1 is a conceptual view schematically showing the entire blockchain network system according to an embodiment of the present invention, and FIG. 2 is a block diagram showing in detail node terminals constituting a blockchain network according to an embodiment of the present invention.

First, referring to FIG. 1, a blockchain network system 1000 according to an embodiment of the present invention may configure a blockchain network of a mesh network topology by one or more node terminals connected through a wired or wireless network. The node terminals may be connected to the blockchain network through an input/output device and exchange data with each other. The blockchain network system 1000 may include various electronic systems, such as a mobile device including a mobile phone, a smart phone, a PDA, a tablet computer, a laptop computer or the like, a computing device including a personal computer, a tablet computer, a netbook computer or the like, a television, a smart television, a security device for gate control and the like, as the node terminal.

In addition, each node terminal may be provided with a communication module for accessing the blockchain network. The blockchain network may be implemented as all kinds of wired and wireless networks such as a local area network (LAN), a wide area network (WAN), a value-added network (VAN), a personal area network (PAN), a mobile radio communication network, a satellite communication network, and the like. If necessary, the blockchain network system 1000 may include a mixture of wired and wireless networks in the configuration.

The blockchain network system 1000 may share information through a Peer-to-Peer (P2P) communication network in which node terminals respectively functioning as a server and a client at the same time are configured as a mesh network, rather than a centralized network configuration divided into a central server and clients.

Referring to FIG. 2, a device constituting a block chain network system 1000 according to an embodiment of the present invention may include a node terminal 100, a participating node terminal 200, a peer node terminal 300, and an NBRP peer node terminal 400.

Among the participating node terminals 200, a terminal that directly communicates with the node terminal 100 may be classified as the peer node terminal 300. The peer node terminal 300 may include a first peer node terminal 310, a second peer node terminal 320, an [n]th peer node terminal 330, and the like.

More specifically, the node terminal 100, the participating node terminal 200, the peer node terminal 300, and the NBRP peer node terminal 400 are connected to a public network in a wired or wireless manner to transmit and receive data. The public network is a communication network constructed and managed by the country or a telecommunication infrastructure operator, and generally includes a telephone network, a data network, a CATV network, a mobile communication network, and the like, and provides connection services so that unspecified many people may access other communication networks or the Internet. In the present invention, the public network is described as a network.

In addition, the node terminal 100 may include a communication module for communicating with the participating node terminal 200, the peer node terminal 300, and the NBRP peer node terminal 400 using a protocol corresponding to each communication network.

The node terminal 100 may construct a blockchain by utilizing a neural block rapid-propagation protocol. The node terminal 100 may exchange data with a directly connected peer node terminal 300 among one or more participating node terminals 200 participating in the blockchain network that exchanges and manages distributed databases through a peer-to-peer (P2P) communication network. At this point, a peer node terminal 300 in which the neural block rapid-propagation protocol (NBRP), which is a specific data communication protocol, is activated may be specifically classified as an NBRP peer node terminal 400.

The neural block rapid-propagation protocol (NBRP) may be activated in a node terminal participating in the blockchain network and applied as a data communication method. The neural block rapid-propagation protocol may confirm a specific identifier by mutually identifying whether a peer node terminal is an NBRP peer node terminal 400 through event processing between the node terminal 100 and the peer node terminal 300. For example, the node terminal 100 and the peer node terminal 300 may exchange an NBRP_CONF message for confirming whether the neural block rapid-propagation protocol is used to determine whether the NBRP peer node terminal 300 is established.

In addition, although the node terminal 100, the participating node terminal 200, the peer node terminal 300, and the NBRP peer node terminal 400 described in this specification may be a personal computer (PC), a laptop computer, a digital broadcasting terminal, a Personal Digital Assistant (PDA), a Portable Multimedia Player (PMP), or the like, the present invention is not limited thereto, and the terminals may be other various devices connected to a network and capable of performing user input and information processing.

Figure 3:
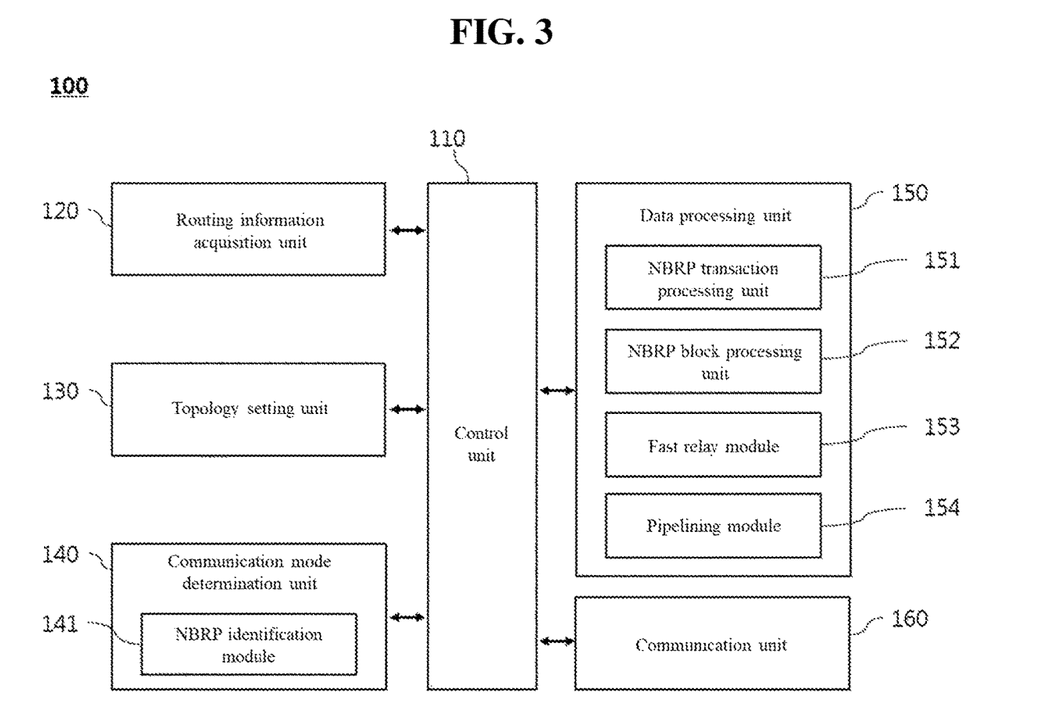
FIG. 3 is a block diagram showing a device for constructing a neural block rapid-propagation protocol-based blockchain according to an embodiment of the present invention.
Figure 4:
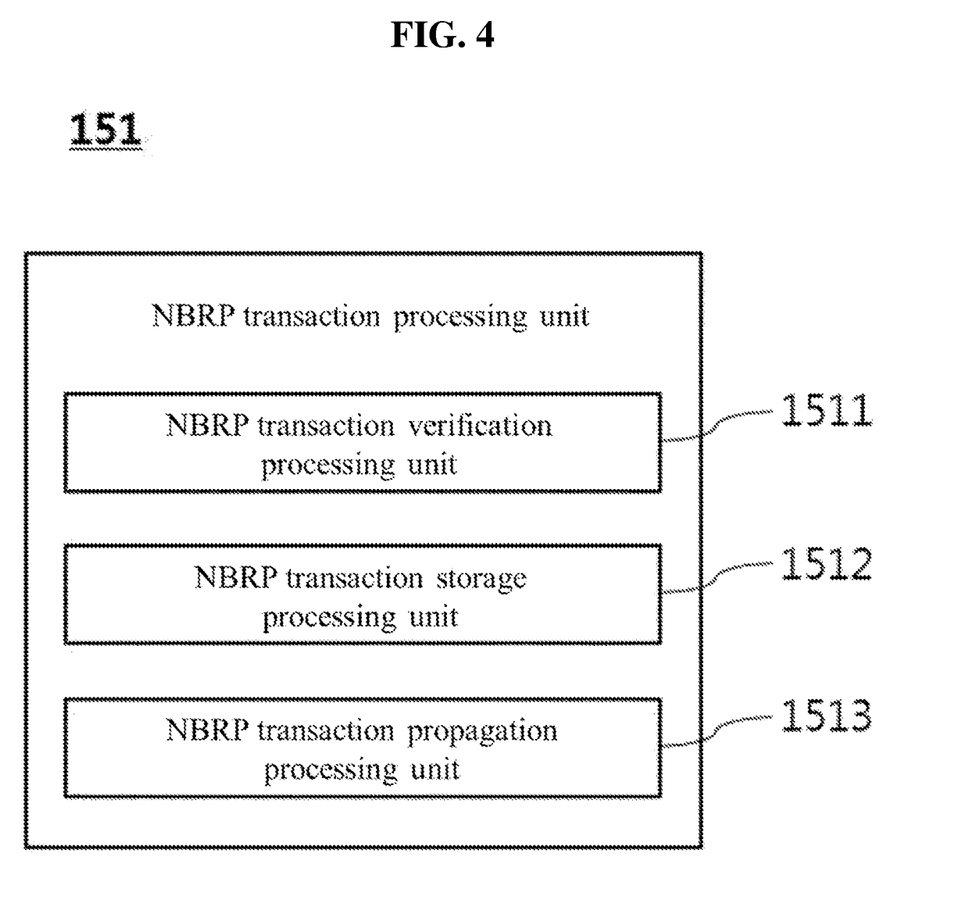
FIGS. 4 and 5 are block diagrams showing in more detail some configurations of a device for constructing a neural block rapid-propagation protocol-based blockchain according to an embodiment of the present invention.

FIG. 3 is a block diagram showing a device for constructing a neural block rapid-propagation protocol-based blockchain according to an embodiment of the present invention, and FIG. 4 is a block diagram showing in more detail some configurations of a device for constructing a neural block rapid-propagation protocol-based blockchain according to an embodiment of the present invention.

Referring to FIG. 3, the node terminal 100 according to an embodiment of the present invention may include a control unit 110, a routing information acquisition unit 120, a topology setting unit 130, a communication mode determination unit 140, an NBRP identification module 141, a data processing unit 150, and a communication unit 160. In addition, the data processing unit 150 may include an NBRP transaction processing unit 151, an NBRP block processing unit 152, a fast relay module 153, and a pipelining module 154.

Figure 5:
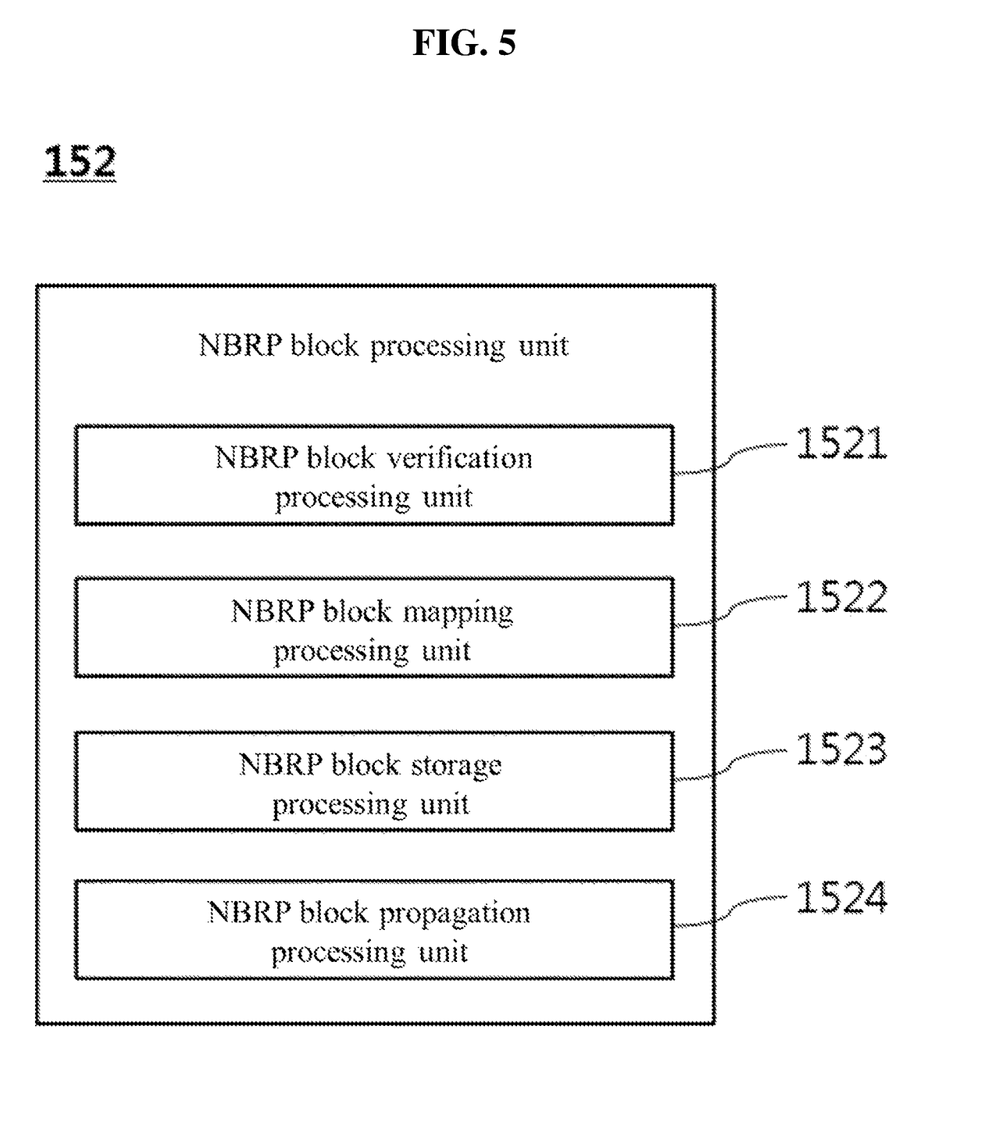

Referring to FIGS. 4 and 5, the NBRP transaction processing unit 151 according to an embodiment of the present invention may further include an NBRP transaction verification processing unit 1511, an NBRP transaction storage processing unit 1512, and an NBRP transaction propagation processing unit 1513. In addition, the NBRP block processing unit 152 may further include an NBRP block verification processing unit 1521, an NBRP block mapping processing unit 1522, an NBRP block storage processing unit 1523, and an NBRP block propagation processing unit 1524.

The control unit 110 may be implemented as one or more processors for overall control of the operation of each component in the node terminal 100.

The routing information acquisition unit 120 may acquire routing information for one or more participating node terminals 200 participating in a blockchain network.

The routing information makes it possible to form a P2P network by utilizing a static routing protocol or a dynamic routing protocol so that the participating node terminal 200 may calculate an optimized network path.

The topology setting unit 130 may activate the neural block rapid-propagation protocol (NBRP) as a method of transmitting and receiving data, and identify a peer node terminal 300 among the participating node terminals 200 on the basis of the routing information.

The communication mode determination unit 140 may determine a communication process by determining whether the neural block rapid-propagation protocol is activated for the peer node terminal.

The communication mode determination unit 140 may include an NBRP identification module 141.

The NBRP identification module 141 may identify the peer node terminal 300 by determining whether or not a peer node terminal is an NBRP peer node terminal 400 according to NBRP identification response information acquired by transmitting an identifier confirmation event of the neural block rapid-propagation protocol to the one or more peer node terminals 300.

The communication process may be determined as an NBRP communication process when an identifier designated as the neural block rapid-propagation protocol is included in the NBRP identification response information.

The NBRP communication process may be used as a method of propagating blocks or transactions constituting the blockchain.

According to an embodiment of the present invention as a transaction propagation method, a second NBRP peer node terminal 420 may verify and store an NBRP_TX message, which is new transaction information received from a first NBRP peer node terminal 410, in a memory pool (Mempool) through the NBRP communication process, and propagate the NBRP_TX message to the [n]th NBRP peer node terminal 430, excluding the second NBRP peer node terminal 420, by way of broadcasting.

According to an embodiment of the present invention as a block propagating method, the second NBRP peer node terminal 420 may verify and store new block information received from the first NBRP peer node terminal 410 in a ledger through an NBRP communication process. Thereafter, the second NBRP peer node terminal 420 may transmit an NBRP_BLOCK message including the new block information to a third NBRP peer node terminal (not shown). The third NBRP peer node terminal may map a new transaction ID included in the new block information to a possessed transaction ID managed by the memory pool (Mempool), and transmit a GET_NBRP_TX message requesting unpossessed transaction ID information to the second NBRP peer node terminal 420 when an unpossessed transaction ID is extracted according to the mapping. In response thereto, the second NBRP peer node terminal 420 may transmit an NBRP_TX message, which is information responding to the GET_NBRP_TX message, to the third NBRP peer node terminal. Through this, the third NBRP peer node terminal 420 may receive the NBRP_TX message, store new block information in the ledger, and then transmit the new block information to the [n]th peer node terminal 430.

The data processing unit 150 may process synchronization and session data communication for transaction data or block data together with the peer node terminal 300 according to the communication process.

The data processing unit 150 may include an NBRP transaction processing unit 151.

The NBRP transaction processing unit 151 may process synchronization and session data communication for transaction data together with the NBRP peer node terminal 400 on the basis of the NBRP communication process.

The NBRP transaction processing unit 151 may include an NBRP transaction verification processing unit 1511. When the communication process corresponds to the NBRP communication process, the NBRP transaction verification processing unit 1511 may receive new transaction information from the first NBRP peer node terminal and perform verification thereon.

The NBRP transaction processing unit 151 may further include an NBRP transaction storage processing unit 1512. The NBRP transaction storage processing unit 1512 may store the verified new transaction information in the memory pool (Mempool) provided as a data storage space.

The NBRP transaction processing unit 151 may further include an NBRP transaction propagation processing unit 1513. The NBRP transaction propagation processing unit 1513 may propagate the verified new transaction information to the NBRP peer node terminals 400, excluding the first NBRP peer node terminal 410, by way of broadcasting.

The data processing unit 150 may further include an NBRP block processing unit 152. The NBRP block processing unit 152 may process synchronization and session data communication for block data together with the NBRP peer node terminals 400 on the basis of the NBRP communication process.

The NBRP block processing unit 152 may include an NBRP block verification processing unit 1521. When the communication process corresponds to the NBRP communication process, the NBRP block verification processing unit 1521 may receive new block information from the first NBRP peer node terminal 410 and perform verification thereon.

The NBRP block processing unit 152 may further include an NBRP block mapping processing unit 1522. The NBRP block mapping processing unit 1522 may map a new transaction ID included in the verified new block information to a possessed transaction ID managed by the memory pool (Mempool). The NBRP block mapping processing unit 1522 may transmit request information for requesting unpossessed transaction ID information to the first NBRP peer node terminal 410 when an unpossessed transaction ID is extracted according to the mapping. The NBRP block mapping processing unit 1522 may include unpossessed transaction ID response information received in response to the request information in the block information.

The NBRP block processing unit 152 may further include an NBRP block storage processing unit 1523. The NBRP block storage processing unit 1523 may store the verified new block information as ledger information.

The NBRP block processing unit 152 may further include an NBRP block propagation processing unit 1524. The NBRP block propagation processing unit 1524 may propagate block header information and transaction ID list information included in the verified new block information to the NBRP peer node terminals 400, excluding the first NBRP peer node terminal 410, by way of broadcasting.

The data processor 150 may further include a fast relay module 153. When the new block information is received from the first NBRP peer node terminal 410, the fast relay module 153 may request transaction information that needs to be updated from the first NBRP peer node terminal 410, and when update transaction information is received in response thereto and data exchange is terminated, the fast relay module 153 may subsequently transmit the update transaction information to the [n]th NBRP peer node terminal 430, and then transmit the new block information to the [n]th NBRP peer node terminal 430.

Specifically, the fast relay module 153 may support data exchange in a data propagation method described below. When the fast relay module 153 is activated, and the first NBRP peer node terminal 410 stores a new block through the NBRP communication process, the node terminal 100 may receive an NBRP_BLOCK message including a block header and a transaction ID from the first NBRP peer node terminal 410.

Thereafter, the node terminal 100 may transmit a GET_NBRP_TX message requesting the transaction ID information, which is not possessed in the possessed transaction ID managed by the memory pool (Mempool) provided as a storage space of the transaction ID and data, to the first NBRP peer node terminal 410.

Accordingly, when an NBRP_TX message, which is response transaction ID information corresponding to the GET_NBRP_TX, is received from the first NBRP peer node terminal 410, the node terminal 100 may transmit the NBRP_TX message to the second NBRP peer node terminal 420.

Subsequently, the node terminal 100 may propagate the new block by transmitting the NBRP_BLOCK message to the second NBRP peer node terminal 420.

Thereafter, the fast relay module 153 may allow the second NBRP peer node terminal 420 to acquire the unpossessed transaction ID information without the GET_NBRP_TX message requesting the transaction ID information, which is not possessed in the possessed transaction ID managed by the memory pool (Mempool) of the second NBRP peer node terminal 420.

The data processing unit 150 may further include a pipelining module 154.

When the new block information is received from the first NBRP peer node terminal 410, the pipelining module 154 may transmit the new block information to the [n]th NBRP peer node terminal 430, transmit transaction information that needs to be updated to the first NBRP peer node terminal 410, receive response transaction information from the first NBRP peer node terminal 410, and transmit the response transaction information to the [n]th NBRP peer node terminal 420 if necessary.

Specifically, the pipelining module 154 may support data exchange in a data propagation method described below. When the pipelining module 154 is activated, and the first NBRP peer node terminal 410 stores a new block through the NBRP communication process, the node terminal 100 may receive an NBRP_BLOCK message including a block header and a transaction ID from the first NBRP peer node terminal 410.

Subsequently, the node terminal 100 may transmit the NBRP_BLOCK message to the second NBRP peer node terminal 420, and thereafter, the node terminal 100 may transmit a GET_NBRP_TX message requesting the transaction ID information, which is not possessed in the possessed transaction ID managed by the memory pool (Mempool) provided as a storage space of the transaction ID and data, to the first NBRP peer node terminal 410.

Then, the node terminal 100 may receive the NBRP_TX message, which is response transaction ID information corresponding to the GET_NBRP_TX, from the first NBRP peer node terminal 410, and subsequently transmit the NBRP_TX message to the second NBRP peer node terminal 420 in response to the request of the second NBRP peer node terminal 420 to finally propagate the new block.

Figure 6:
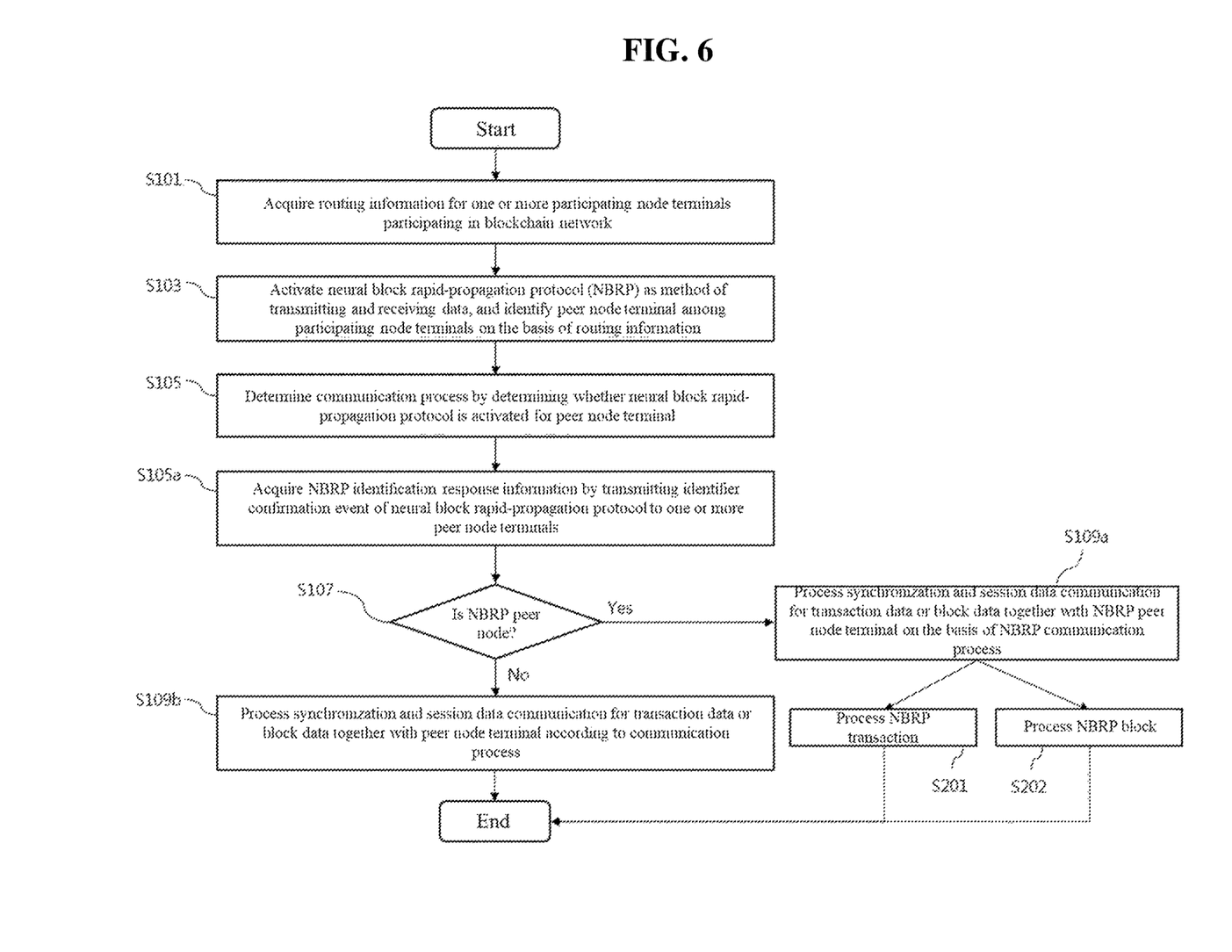
FIG. 6 is a flowchart illustrating an operation method of a device for constructing a neural block rapid-propagation protocol-based blockchain according to an embodiment of the present invention.
Figure 7:
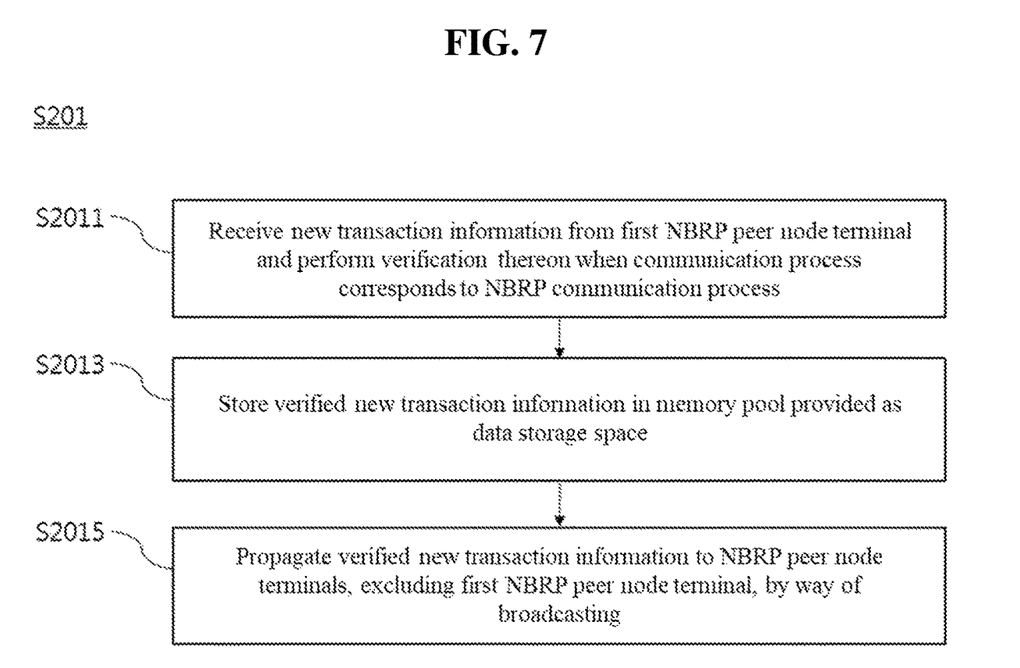
FIGS. 7 and 8 are flowcharts illustrating in detail some methods in an operation method of a device for constructing a neural block rapid-propagation protocol-based blockchain according to an embodiment of the present invention.
Figure 8:
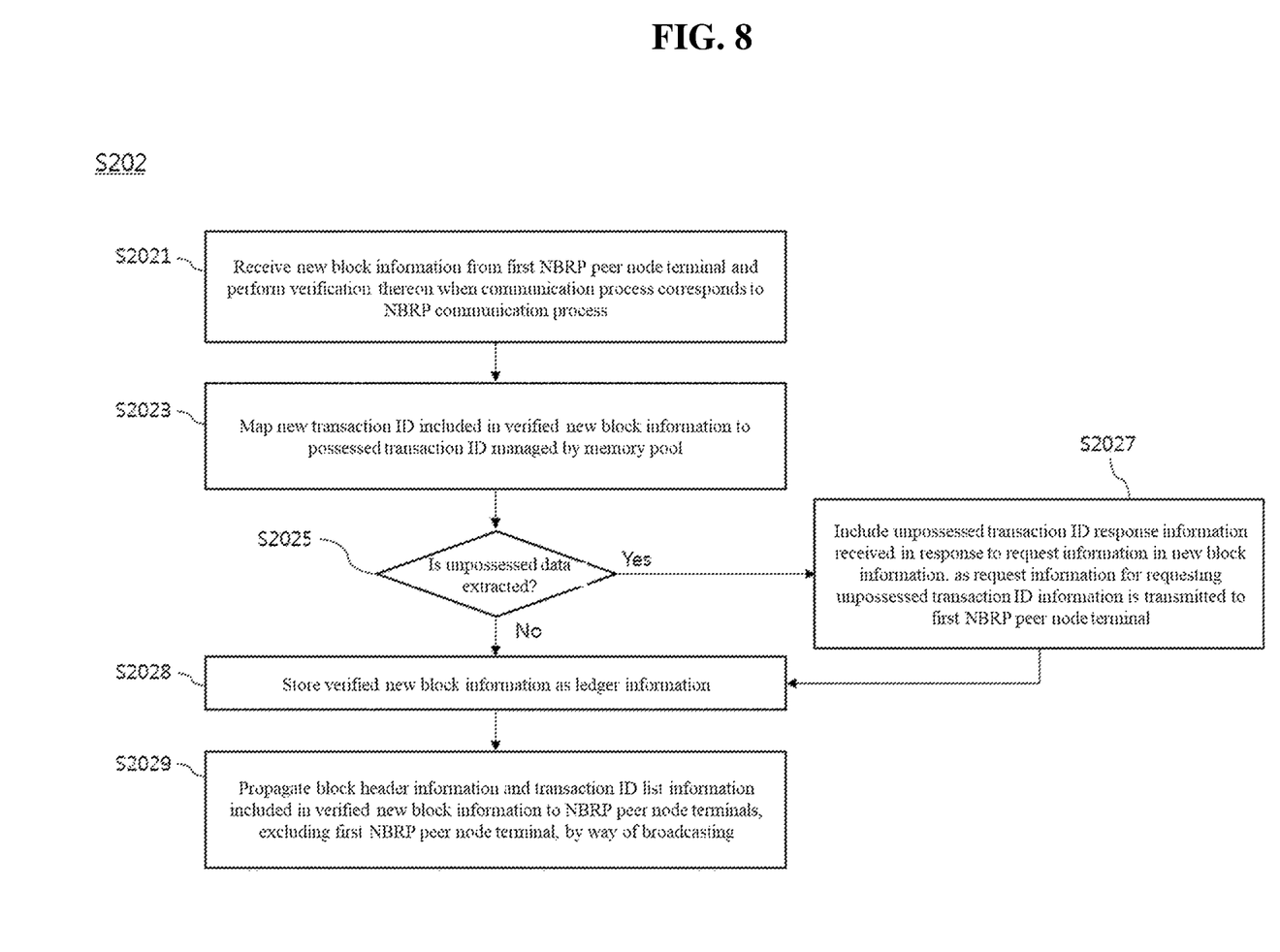

FIG. 6 is a flowchart illustrating an operation method of a device for constructing a neural block rapid-propagation protocol-based blockchain according to an embodiment of the present invention. FIGS. 7 and 8 are flowcharts illustrating in detail some methods in an operation method of a device for constructing a neural block rapid-propagation protocol-based blockchain according to an embodiment of the present invention.

Referring to FIG. 6, in the operation method of a device for constructing a blockchain based on a neural block rapid-propagation protocol, the routing acquisition step (S101) may acquire routing information for one or more participating node terminals 200 participating in a blockchain network.

The routing information makes it possible to form a P2P network by utilizing a static routing protocol or a dynamic routing protocol so that the participating node terminal 200 may calculate an optimized network path.

The topology setting step (S103) may activate the neural block rapid-propagation protocol (NBRP) as a method of transmitting and receiving data, and identify a peer node terminal 300 among the participating node terminals 200 on the basis of the routing information.

The communication mode determination step (S105) may determine a communication process by determining whether the neural block rapid-propagation protocol is activated for the peer node terminal. The communication process may be determined as an NBRP communication process when an identifier designated as the neural block rapid-propagation protocol is included in the NBRP identification response information.

The communication mode determination step (S105) may include an NBRP identification step (S105a). The NBRP identification step (S105a) may acquire NBRP identification response information by transmitting an identifier confirmation event of the neural block rapid-propagation protocol to the one or more peer node terminals. The NBRP identification step (S105a) may identify the peer node terminal 300 by determining whether or not the peer node terminal 300 is an NBRP peer node terminal 400 (S107) according to the NBRP identification response information.

The data processing step (S109b) may process synchronization and session data communication for transaction data or block data together with the peer node terminal 300 according to the communication process.

At this point, when the peer node terminal 300 is identified as the NBRP peer node terminal 400, the communication process is applied as the NBRP communication process to perform the NBRP data processing step (S109a) of processing synchronization and session data communication for transaction data or block data together with the NBRP peer node terminal 400.

Referring to FIGS. 7 and 8, the NBRP data processing step (S109a) may include an NBRP transaction processing step (S201) of processing synchronization and session data communication for transaction data together with the NBRP peer node terminal 400 on the basis of the NBRP communication process.

The NBRP transaction processing step (S201) may include an NBRP transaction verification processing step (S2011) of receiving new transaction information from the first NBRP peer node terminal 410 and performing verification thereon when the communication process corresponds to the NBRP communication process.

A memory pool (Mempool) is provided as a data storage space, and the NBRP transaction processing step (S201) may further include an NBRP transaction storage processing step (S2013) of storing the verified new transaction information in the memory pool (Mempool) after executing the NBRP transaction verification processing step (S2011).

The NBRP transaction processing step (S201) may further include an NBRP transaction propagation processing step (S2015) of propagating the verified new transaction information to the NBRP peer node terminals, excluding the first NBRP peer node terminal 410, by way of broadcasting after executing the NBRP transaction storage processing step (S2013).

The NBRP data processing step (S109a) may include an NBRP block processing step (S202) of processing synchronization and session data communication for block data together with the NBRP peer node terminal 400 on the basis of the NBRP communication process.

The NBRP block processing step (S202) may include an NBRP block verification processing step (S2021) of receiving new block information from the first NBRP peer node terminal 410 and performing verification thereon when the communication process corresponds to the NBRP communication process.

The NBRP block processing step (S202) may map a new transaction ID included in the verified new block information to a possessed transaction ID managed by the memory pool (Mempool) (S2023) after executing the NBRP block verification processing step (S2021).

Thereafter, the NBRP block processing step (S202) may determine whether the new transaction ID matches the possessed transaction ID managed by the memory pool (Mempool) (S2025).

Accordingly, the NBRP block processing step (S202) may further include an NBRP block mapping processing step (S2027) of including, when the request information for requesting unpossessed transaction ID information is transmitted to the first NBRP peer node terminal 410 when an unpossessed transaction ID is extracted according to the mapping, unpossessed transaction ID response information received in response to the request information in the new block information.

The NBRP block processing step (S202) may further include an NBRP block storage processing step (S2028) of storing the verified new block information as ledger information.

The NBRP block processing step (S2022) may further include an NBRP block propagation processing step (S2029) of propagating block header information and transaction ID list information included in the verified new block information to the NBRP peer node terminals, excluding the first NBRP peer node terminal 410, by way of broadcasting after executing the NBRP block storage processing step (S2028).

In addition, the NBRP data processing step (S109a) may further include a fast relay step (not shown). The fast relay step may receive an NBRP_BLOCK message including a block header and a transaction ID from the first NBRP peer node terminal 410 when the first NBRP peer node terminal 410 stores a new block through the NBRP communication process, transmit a GET_NBRP_TX message requesting the transaction ID information, which is not possessed in the possessed transaction ID managed by the memory pool (Mempool) provided as a storage space of the transaction ID and data, to the first NBRP peer node terminal 410, transmit an NBRP_TX message, which is response transaction ID information corresponding to the GET_NBRP_TX, to the second NBRP peer node terminal 420 when the NBRP_TX message is received from the first NBRP peer node terminal, and subsequently propagate the new block by transmitting the NBRP_BLOCK message to the second NBRP peer node terminal 420.

In addition to this, the NBRP data processing step (S109a) may further include a pipelining step (not shown). The pipelining step may receive an NBRP_BLOCK message including a block header and a transaction ID from the first NBRP peer node terminal 410 when the first NBRP peer node terminal 410 stores a new block through the NBRP communication process, subsequently transmit the NBRP_BLOCK message to the second NBRP peer node terminal 420, transmit a GET_NBRP_TX message requesting the transaction ID information, which is not possessed in the possessed transaction ID managed by the memory pool (Mempool) provided as a storage space of the transaction ID and data, to the first NBRP peer node terminal 410, receive an NBRP_TX message, which is response transaction ID information corresponding to the GET_NBRP_TX, from the first NBRP peer node terminal, and subsequently propagate the new block by transmitting the NBRP_TX message to the second NBRP peer node terminal 420 in response to the request information of the second NBRP peer node terminal 420.

Figure 9:
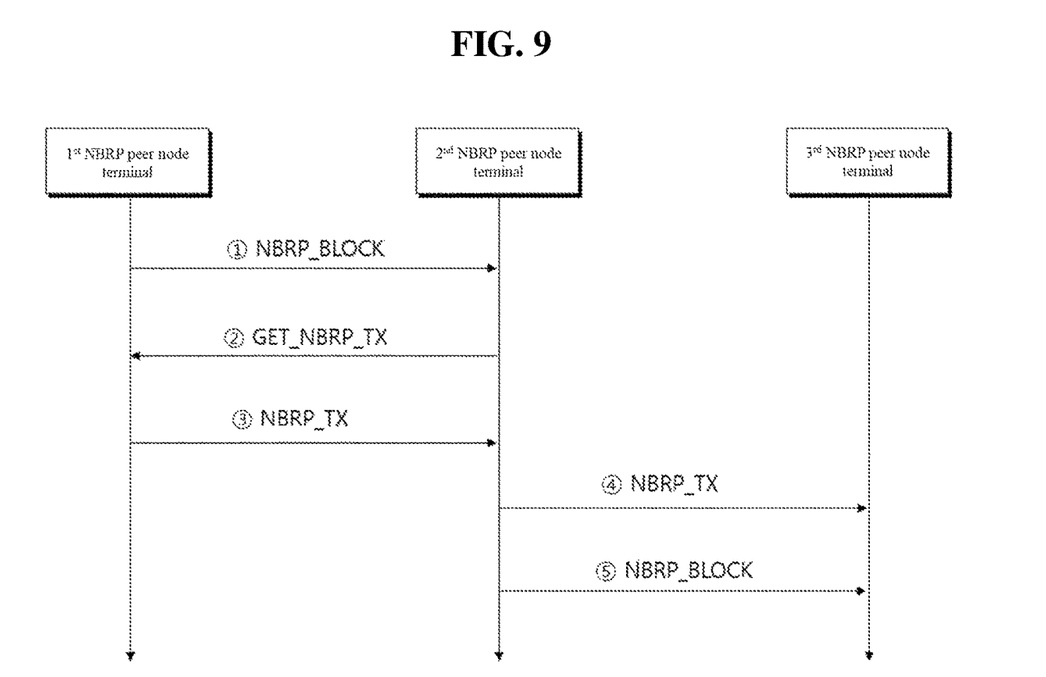
FIG. 9 is a ladder diagram illustrating fast relay, which is a data communication method using a neural block rapid-propagation protocol according to an embodiment of the present invention.

FIG. 9 is a ladder diagram illustrating fast relay, which is a data communication method using a neural block rapid-propagation protocol according to an embodiment of the present invention.

Referring to FIG. 9, a fast relay communication method for propagating blocks between node terminals may be activated among node terminals in which the neural block rapid-propagation protocol is executed.

In the fast relay communication method, the first NBRP peer node terminal transmits an NBRP_BLOCK message to the second NBRP peer node terminal. In response thereto, the second NBRP peer node terminal analyzes the NBRP_BLOCK message and transmits a GET_NBRP_TX message requesting update data to the first NBRP peer node terminal through confirmation of unpossessed transaction information. In response thereto, the first NBRP peer node terminal transmits an NBRP_TX message, which is information responding to the GET_NBRP_TX message, to the second NBRP peer node terminal. Sequentially, the second NBRP peer node terminal transmits the received NBRP_TX message to the third NBRP peer node terminal. As a next step, the second NBRP peer node terminal transmits the NBRP_BLOCK message to the third NBRP peer node terminal.

Figure 10:
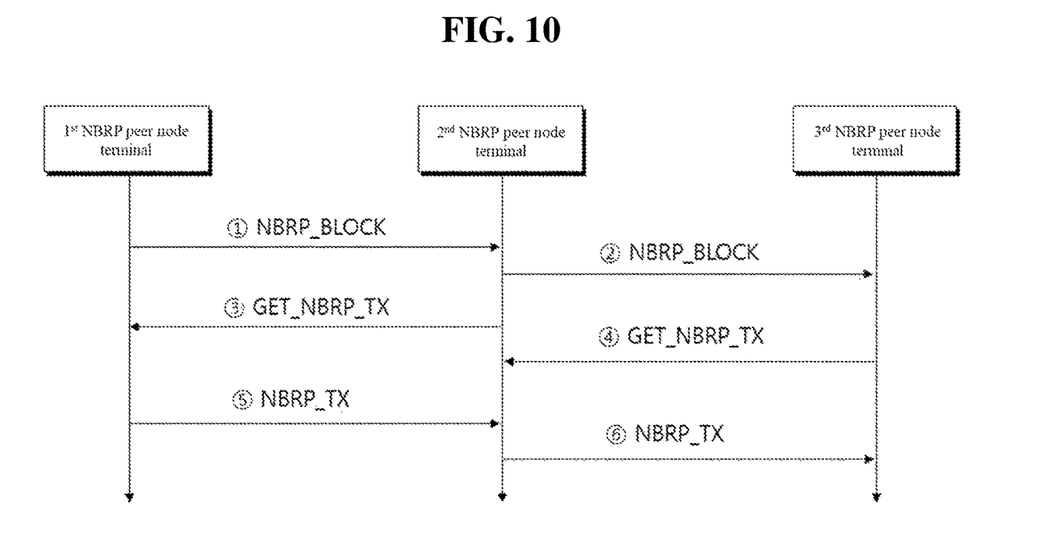
FIG. 10 is a ladder diagram illustrating pipelining, which is a data communication method using a neural block rapid-propagation protocol according to an embodiment of the present invention.

FIG. 10 is a ladder diagram illustrating pipelining, which is a data communication method using a neural block rapid-propagation protocol according to an embodiment of the present invention.

Referring to FIG. 10, a pipelining communication method for propagating blocks between node terminals may be activated among node terminals in which the neural block rapid-propagation protocol is executed.

In the pipelining communication method, first, the first NBRP peer node terminal transmits an NBRP_BLOCK message to the second NBRP peer node terminal. Subsequently, the second NBRP peer node terminal transmits the NBRP_BLOCK message to the third BRP peer node terminal. As a next step, the second NBRP peer node terminal transmits a GET_NBRP_TX message requesting unpossessed transaction information to the first NBRP peer node terminal. Subsequently, the third NBRP peer node terminal transmits a GET_NBRP_TX message requesting unpossessed transaction information to the second NBRP peer node terminal. As a next step, the first NBRP peer node terminal transmits an NBRP_TX message, which is response information, to the second NBRP peer node terminal. Subsequently, the second NBRP peer node terminal transmits the NBRP_TX message to the third NBRP peer node terminal.

The methods according to the present invention described above may be manufactured as a program to be executed on a computer and stored in a computer-readable recording medium, and examples of the computer-readable recording medium include ROM, RAM, CD-ROM, magnetic tapes, floppy disks, optical data storage devices and the like, and also includes those implemented in the form of a carrier wave (e.g., transmission over the Internet).

The computer-readable recording medium may be distributed in computer systems connected through a network, so that computer-readable codes may be stored and executed in a distributed manner. In addition, functional programs, codes, and code segments for implementing the method may be easily inferred by the programmers in the art to which the present invention belongs.

In addition, although preferred embodiments of the present invention have been illustrated and described above, the present invention is not limited to the specific embodiments described above, and various modified embodiments can be made by those skilled in the art without departing from the gist of the invention claimed in the claims, and in addition, these modified embodiments should not be individually understood from the spirit or perspective of the present invention.

The invention claimed is:

1. A node terminal connected to a blockchain network, the node terminal comprising:
    a routing information acquisition processor acquiring routing information for one or more participating node terminals participating in the blockchain network;
    a topology setting processor activating a neural block rapid-propagation protocol (NBRP) as a method of transmitting and receiving data, and identifying a peer node terminal among the participating node terminals on the basis of the routing information;
    a communication mode determination processor determining a communication process by determining whether the neural block rapid-propagation protocol is activated for the peer node terminal; and
    a data processor processing synchronization and session data communication for transaction data or block data together with the peer node terminal according to the communication process,
    wherein, the communication mode determination processor includes an NBRP identification module for identifying the peer node terminal by determining whether or not a peer node terminal is an NBRP peer node terminal according to NBRP identification response information acquired by transmitting an identifier confirmation event of the neural block rapid-propagation protocol to one or more peer node terminals,
    wherein the communication process is determined as an NBRP communication process when an identifier designated as the neural block rapid-propagation protocol is included in the NBRP identification response information,
    wherein the data processor includes a fast relay module for receiving an NBRP_BLOCK message including a block header and a transaction ID from a first NBRP peer node terminal when the first NBRP peer node terminal stores a new block through the NBRP communication process, transmitting a GET_NBRP_TX message requesting transaction ID information, which is not possessed in the possessed transaction ID managed by a memory pool (Mempool) provided as a storage space of the transaction ID and data, to the first NBRP peer node terminal, transmitting an NBRP_TX message, which is response transaction ID information corresponding to the GET_NBRP_TX, to a second NBRP peer node terminal when the NBRP_TX message received from the first NBRP peer node terminal, and subsequently propagating the new block by transmitting the NBRP_BLOCK message to the second NBRP peer node terminal.

2. The node terminal according to claim 1, wherein the data processor includes an NBRP transaction processing processor, wherein
    the NBRP transaction processing processor includes:
    an NBRP transaction verification processor receiving new transaction information from the first NBRP peer node terminal and performing verification thereon when the communication process corresponds to the NBRP communication process;
    an NBRP transaction storage processor storing the verified new transaction information in the memory pool (Mempool) provided as a data storage space; and
    an NBRP transaction propagation processor propagating the verified new transaction information to NBRP peer node terminals; excluding the first NBRP peer node terminal, by way of broadcasting.

3. The node terminal according to claim 2, wherein the data processor further includes an NBRP block processor, wherein
    the NBRP block processor includes:
    an NBRP block verification processor receiving new block information from the first NBRP peer node terminal and performing verification thereon when the communication process corresponds to the NBRP communication process;
    an NBRP block storage processor storing the verified new block information as ledger information; and
    an NBRP block propagation processor propagating block header information and transaction ID list information included in the verified new block information to NBRP peer node terminals; excluding the first NBRP peer node terminal, by way of broadcasting.

4. The node terminal according to claim 3, wherein the NBRP block processor further includes an NBRP block mapping processor mapping a new transaction ID included in the verified new block information to a possessed transaction ID managed by the memory pool (Mempool), transmitting request information for requesting unpossessed transaction ID information to the first NBRP peer node terminal when an unpossessed transaction ID is extracted according to the mapping, and including unpossessed transaction ID response information received in response to the request information in the verified new block information.

5. A node terminal connected to a blockchain network, the node terminal comprising:
    a routing information acquisition processor acquiring routing information for one or more participating node terminals participating in the blockchain network;
    a topology setting processor activating a neural block rapid-propagation protocol (NBRP) as a method of transmitting and receiving data, and identifying a peer node terminal among the participating node terminals on the basis of the routing information;
    a communication mode determination processor determining a communication process by determining whether the neural block rapid-propagation protocol is activated for the peer node terminal; and
    a data processor processing synchronization and session data communication for transaction data or block data together with the peer node terminal according to the communication process,
    wherein the communication mode determination processor includes an NBRP identification module for identifying the peer node terminal by determining whether or not a peer node terminal is an NBRP peer node terminal according to NBRP identification response information acquired by transmitting an identifier confirmation event of the neural block rapid-propagation protocol to one or more peer node terminals, when the communication process is determined as an NBRP communication process when an identifier designated as the neural block rapid-propagation protocol is included in the NBRP identification response information, wherein the data processor includes a pipelining module for receiving an NBRP_BLOCK message including a block header and a transaction ID from a first NBRP peer node terminal when the first NBRP peer node terminal stores a new block through the NBRP communication process, subsequently transmitting the NBRP_BLOCK message to second NBRP peer node terminal, transmitting a GET_NBRP_TX message requesting transaction ID information, which is not possessed in the possessed transaction ID managed by a memory pool (Mempool) provided as a storage space of the transaction ID and data, to the first NBRP peer node terminal, receiving an NBRP_TX message, which is response transaction ID information corresponding to the GET_NBRP_TX, from the first NBRP peer node terminal, and subsequently propagating the new block by transmitting the NBRP_TX message to the second NBRP peer node terminal in response to request information of the second NBRP peer node terminal.

6. An operation method of a node terminal connected to a blockchain network, the method comprising:

a routing information acquisition step of acquiring routing information for one or more participating node terminals participating in the blockchain network;

a topology setting step of activating a neural block rapid-propagation protocol (NBRP) as a method of transmitting and receiving data, and identifying a peer node terminal among the participating node terminals on the basis of the routing information;

a communication mode determination step of determining a communication process by determining whether the neural block rapid-propagation protocol is activated for the peer node terminal; and a data processing step of processing synchronization and session data communication for transaction data or block data together with the peer node terminal according to the communication process, wherein the communication mode determination step includes an NBRP identification step of identifying the peer node terminal by determining whether or not a peer node terminal is an NBRP peer node terminal according to NBRP identification response information acquired by transmitting an identifier confirmation event of the neural block rapid-propagation protocol to one or more peer terminals, wherein the communication process is determined as an NBRP communication process when an identifier designated as the neural block rapid-propagation protocol is included in the NBRP identification response information, wherein the data processing step includes a fast relay step of receiving an NBRP_BLOCK message including a block header and transaction ID from a first NBRP peer node terminal when the first NBRP peer node terminal stores a new block through the NBRP communication process, transmitting a GET_NBRP_TX message requesting transaction ID information, which is not possessed in the possessed transaction ID managed by a memory pool (Mempool) provided as a storage space of t transaction ID and data, to the first NBRP peer node terminal, transmitting an NBRP_TX message, which is response transaction ID information corresponding to the GET_NBRP_TX, to a second NBRP peer node terminal the NBRP_TX message received from the first NBRP peer node terminal, and subsequently propagating the new block by transmitting the NBRP_BLOCK message to the second NBRP peer node terminal.

7. The method according to claim 6, wherein the data processing step includes an NBRP transaction processing step, wherein the NBRP transaction processing step includes:

an NBRP transaction verification processing step of receiving new transaction information from a first NBRP peer node terminal and performing verification thereon when the communication process corresponds to the NBRP communication process;

an NBRP transaction storage processing step of storing the verified new transaction information in the memory pool (Mempool) provided as a data storage space; and an NBRP transaction propagation processing step of propagating the verified new transaction information to NBRP peer node terminals; excluding the first NBRP peer node terminal, by way of broadcasting.

8. The method according to claim 7, wherein the data processing step further includes an NBRP block processing step, wherein the NBRP block processing step includes:

an NBRP block verification processing step of receiving new block information from the first NBRP peer node terminal and performing verification thereon when the communication process corresponds to the NBRP communication process;

an NBRP block storage processing step of storing the verified new block information as ledger information; and an NBRP block propagation processing step of propagating block header information and transaction ID list information included in the verified new block information to the NBRP peer node terminals; excluding the first NBRP peer node terminal, by way of broadcasting.

9. The method according to claim 8, wherein the NBRP block processing step further includes:

an NBRP block mapping processing step of mapping a new transaction ID included in the verified new block information to a possessed transaction ID managed by the memory pool (Mempool), transmitting request information for requesting unpossessed transaction ID information to the first NBRP peer node terminal when an unpossessed transaction ID is extracted according to the mapping, and including unpossessed transaction ID response information received in response to the request information in the verified new block information.

10. The method according to claim 6, wherein the data processing step includes a pipelining step of receiving an NBRP_BLOCK message including a block header and a transaction ID from a first NBRP peer node terminal when the first NBRP peer node terminal stores a new block through the NBRP communication process, subsequently transmitting the NBRP_BLOCK message to the second NBRP peer node terminal, transmitting a GET_NBRP_TX message requesting transaction ID information, which is not possessed in the possessed transaction ID managed by the memory pool (Mempool) provided as a storage space of the transaction ID and data, to the first NBRP peer node terminal, receiving an NBRP_TX message, which is response transaction ID information corresponding to the GET_NBRP_TX, from the first NBRP peer node terminal, and subsequently propagating the new block by transmitting the NBRP_TX message to the second NBRP peer node terminal in response to request information of the second NBRP peer node terminal.

\* \* \* \* \*